United States Patent
Ohtani

(10) Patent No.: US 6,621,620 B2
(45) Date of Patent: Sep. 16, 2003

(54) OPTICAL AMPLIFICATION SYSTEM USING RAMAN AMPLIFICATION

(75) Inventor: Toshihiro Ohtani, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/960,979

(22) Filed: Sep. 25, 2001

(65) Prior Publication Data

US 2003/0002145 A1 Jan. 2, 2003

(30) Foreign Application Priority Data

Jun. 27, 2001 (JP) ........................................ 2001-195145

(51) Int. Cl.⁷ ................................................. H01S 3/00
(52) U.S. Cl. ........................................................ 359/334
(58) Field of Search ........................................... 359/334

(56) References Cited

U.S. PATENT DOCUMENTS

| | | | | |
|---|---|---|---|---|
| 5,966,206 A | * | 10/1999 | Jander | 356/73.1 |
| 5,986,755 A | * | 11/1999 | Ornitz et al. | 356/301 |
| 6,263,139 B1 | | 7/2001 | Kawakami et al. | 385/123 |
| 6,373,621 B1 | * | 4/2002 | Large et al. | 359/334 |
| 6,433,922 B1 | * | 8/2002 | Ghera et al. | 359/334 |
| 2001/0040719 A1 | * | 11/2001 | Okuno et al. | 359/334 |
| 2002/0024721 A1 | * | 2/2002 | Tsuzaki et al. | 359/334 |
| 2002/0131099 A1 | * | 9/2002 | Harasawa | 359/110 |
| 2002/0140927 A1 | * | 10/2002 | Sobe et al. | 356/73.1 |

FOREIGN PATENT DOCUMENTS

JP 03013836 A * 1/1991 .......... G01M/11/02

OTHER PUBLICATIONS

Sato et al. A 1.6 micrometer Band OTDR Using a Synchronous Raman Fiber Amplifier. IEEE Photonics Technology Letters, vol. 00, No. 0, Aug. 1992. pp. 923–924.*

* cited by examiner

Primary Examiner—Thomas G. Black
Assistant Examiner—Deandra M. Hughes
(74) Attorney, Agent, or Firm—Staas & Halsey LLP

(57) ABSTRACT

An optical amplification system connected via a connector to an optical transmission path through which Raman excitation lights are sent out prevents the Raman excitation lights from entering and keeps the Laser Safety function caused by the detection of reflection light when the optical connector is disconnected. The optical amplification system includes an optical amplifier to amplify optical main signals; an optical receiver element to detect reflection lights from an end face of the connector, when the connector is disconnected; a circuit to reduction control the output power of the optical amplifier, based on the detection of the reflection light by the optical receiver element; and a blocking filter inserted between the optical amplifier and the connector, for blocking the Raman excitation lights.

19 Claims, 15 Drawing Sheets

OPTICAL AMPLIFICATION SYSTEM USING RAMAN AMPLIFICATION

BACKGROUND OF THE INVENTION

1. Field of the Invention

The present invention relates to an optical amplification system using Raman amplification.

2. Description of the Related Arts

As a high-capacity technology, attention is being given to a wavelength division multiplexing (WDM: Wavelength Division Multiplexing) technology that allows a multiplicity of optical signals having different wavelengths to be transmitted through a single optical fiber. Moreover, in a WDM transmission system with the use of such a wavelength division multiplexing technology, a Raman amplification has been introducing to extend one span (the opposed node-to-node) interval longer.

Here, the Raman amplification means a technology to amplify signal lights, using an induction Raman diffusion phenomenon, one of non-linear effects within an optical fiber. When a signal light and an excitation light having shorter wavelength than that of the signal light for its specific Raman shift amount are inputted into an optical fiber, the signal light will be amplified within the optical fiber.

In other words, the excitation light having shorter wavelength than that of the signal light for its specific Raman shift amount allows a dipole to be generated within the optical fiber. And, optical amplification will be carried out, when a light whose wavelength is the same as that of the signal light is radiated, while returning to the normal order, after the energy is lost for the specific number of oscillations of the excitation light, with the signal light passing through.

FIGS. 1A to 1C show examples of a system with the use of such a Raman amplification. FIGS. 1A to 1C also show optical amplifiers (optical AMPS) 1 and 2 to be placed in the optical amplification system at each node (including the terminal station node and the repeater node) of one span-to-one span connected with a transmission path 3.

Generally, the optical amplifiers 1 and 2 are classified into a post amplifier that serves as a power amplifier when being placed at a transmitter of the terminal station node, and a preamplifier that amplifies weak signals when being placed at a receiver of the terminal station node. Moreover, when the optical amplifier is placed at the middle point of a circuit, in short, at a repeater node, it is classified as an in-line amplifier.

In a system shown in FIG. 1A, a Raman excitation light source (LS)4 is placed on the side of the optical amplifier 1, and the excitation light is sent out to an optical transmission path 3 in the same direction as the propagation direction of the main signal light. This mode is called a forward excitation. In a system shown in FIG. 1B, a Raman excitation light source 5 is placed on the side of the optical amplifier 2, and a Raman excitation light is sent out to the optical transmission path 3 in the reverse direction of the propagation direction of the main signal light. This mode is called a backward excitation. In addition, in a system shown in FIG. 1C, the Raman excitation light sources 4 and 5 are placed on the side of the optical amplifiers 1 or on the side of the amplifier 2, respectively, and the Raman excitation light is sent out to the optical transmission path 3 in the same or in the reverse direction of the propagation direction of the main signal light. This mode is called a two-way excitation.

Here, out of the three excitation modes, in the backward excitation (FIG. 1B) and the two-way excitation (FIG. 1C), the Raman excitation light is radiated in, in the reverse direction of the propagation direction of the main signal light. In such a case, at the upstream optical amplifier 1, the Raman excitation light will be radiated in from its output side.

Usually, on an optical amplifier, a laser ray having a power of 0 dBm through +20 dBm will be outputted to the optical transmission path 3 to be connected from the output area through a connector. Due to this reason, in consideration of the safety of a person who handles the device, the optical amplifier has a function (Laser Safety function) to reduce the output of the optical amplifier, detecting a Fresnel reflection at the location where the connector coming out of the output area of the optical amplifier.

However, as described above, in the backward excitation (FIG. 1B) and the two-way excitation (FIG. 1C), the Raman excitation light will be radiated in from the output side of the optical amplifier 1. Therefore, even if the connector is properly seated in place, due to the input of the Raman excitation light from the downstream, on the optical amplifier, a control function will be ON to reduce the output of the optical amplifier, misrecognizing the inputted light as a Fresnel reflection light to be generated if the connector is removed. In order to avoid such a failure, in normal operation, the Laser Safety function will be masked (stopped).

The masking treatment of the Laser Safety Function in such a normal operation will be controlled as follows, using the opposed circuit (transmission path).

FIG. 2 illustrates the masking treatment of the Laser Safety Function, and in this drawing, opposing optical amplification systems A and B are connected with the optical transmission path (OTP)3 having opposing transmission paths 30 and 31.

Assuming that the optical amplification systems A and B would be the end station nodes, optical amplifiers 1 and 10 correspond to the post amplifiers, and optical amplifiers 2 and 20 correspond to the preamplifiers. Also, if the optical amplification systems A and B would be the relay nodes, optical amplifiers 1, 2, 10 and 20 correspond to the in-line amplifiers.

The optical amplification systems A and B are connected with the transmission path 30 in the downward direction (direction from the optical amplifier 1 to the optical amplifier 2) and the transmission path 31 in the upward direction (direction from the optical amplifier 10 to the optical amplifier 20). The masking treatment of the Laser Safety Function will be controlled in the following procedure.

S1: If there is no trouble in the optical transmission path 3 (downward direction transmission path 30), the smooth passage of signals will be checked on the side of the downstream optical amplifier 2.

S2: The result of checking the smooth passage of signals will be transmitted to the optical amplifier 10 on the side of the transmission path 31 in the upward direction opposing to the optical amplification system B.

S3: In addition, from the optical amplifier 10, the check information will be sent to the optical amplifier 20 on the downstream side of the optical amplification system A through the upward direction transmission path 31, with the use of SV (monitor) signals.

S4: When the optical amplifier 20 for the optical amplification system A receives the check information, the information will be transmitted to the optical amplifier 1 on the side of the opposed circuit.

S5: By this procedure, to the optical amplifier 1, control is carried out to mask the Laser Safety function.

Moreover, on the systems as illustrated in FIG. 3, the following shows examinations on emergency procedures when the opposing transmission path 31 is in trouble.

S10: When the opposing transmission path 31 is OFF,
S11: At the optical amplifier 20 for the optical amplification system A, OFF state of the SV (monitor) signal will be detected.

S12: The information that the SV (monitor) signal is in the OFF state will be transmitted to the side of the optical amplifier 1.

S13: Thus, the masking treatment of the Laser Safety Function of the optical amplifier 1 will be released, and the optical amplifier 1 will be controlled to continuously send out laser lights. However, in such a case, by releasing the masking treatment of the Laser Safety Function, the optical amplifier 1 will regard the Raman excitation light from the downstream side (side of the optical amplifier 2) as the reflection light to be generated when the connector is in the removed state, thereby causing the output to be lowered.

Here, as illustrated in FIG. 2, the masking treatment of the Laser Safety Function is complicated. Also in FIG. 3, if the opposing transmission path has any trouble, the optical amplifier 1 will be brought in the uncontrolled state because the information cannot be transmitted to the upstream.

From this reason, operators can be exposed to risks because signal lights of high output power will be continuously sent out due to the connector being removed from the amplifier. To prevent such risks, masking of the Laser Safety Function will be released. However, on the other hand, a problem can take place that a misrecognition of the input of the Raman excitation light as the Fresnel reflection light caused by removal of the connector could bring the output of the amplifier down to a safety light level.

Due to this, consequences of the troubled opposing transmission path could adversely affect the signal transmission of transmission paths having no trouble.

Therefore, for an optical transmission system without Raman excitation and an optical transmission system with Raman excitation, basic configuration of hardware should be changed. The change could lead up to an increase in cost for the resultant optical transmission systems. Moreover, this could be a significant bottleneck, in the event that an optical transmission system was made up without Raman excitation at the time of initial introduction, on the assumption that the optical transmission system would be sequentially extended, and a Raman excitation light source would be added as the increase in the number of wavelengths in the future.

SUMMARY OF THE INVENTION

It is therefore the object of the present invention to provide an optical amplification system that can eliminate such deficiencies.

In order to achieve the above object, according to a first aspect of the present invention there is provided an optical amplification system connected via a connector to an optical transmission path through which Raman excitation lights are sent out, the optical amplification system comprising an optical amplifier to amplify optical main signals; an optical receiver element to detect reflection lights from an end face of the connector, when the connector is disconnected; a circuit to reduction control the output power of the optical amplifier, based on the detection of the reflection light by the optical receiver element; and a blocking filter inserted between the optical amplifier and the connector, for blocking the Raman excitation lights.

In order to achieve the above object, according to a second aspect of the present invention there is provided an optical amplification system connected via a connector to an optical transmission path through which Raman excitation lights are sent out, the optical amplification system comprising an optical amplifier to amplify optical main signals; a Raman excitation light source to output Raman excitation lights; a wave synthesizer to synthesize optical main signals amplified by the optical amplifier, and the Raman excitation lights, for sending out to the transmission path; an optical receiver element to detect reflection lights from an end face of the connector, when the connector is disconnected; a circuit to reduction control the output power of the optical amplifier, based on the detection of reflection light by the optical receiver element; and a blocking filter inserted between the optical amplifier and the connector, for blocking the Raman excitation light.

In order to achieve the above object, according to a third aspect of the present invention there is provided an optical transmission system comprising a transmitter-side optical amplification system and a receiver-side optical amplification system which are connected through an optical transmission path through which a Raman excitation light is sent out, the transmitter-side optical amplification system including a connector connected to the optical transmission path; a pair of optical amplifiers to amplify wavelength multiplexed signals each having a different wavelength band; a coupler which synthesizes the outputs of the pair of optical amplifiers, for output to the optical transmission path through the connector; and a blocking filter placed between the coupler and the connector, for blocking wavelength bands of excitation lights for the wavelength multiplexed signals each having a different wavelength band.

In order to achieve the above object, according to a fourth aspect of the present invention there is provided an optical transmission system comprising a transmitter-side optical amplification system and a receiver-side optical amplification system which are connected through an optical transmission path through which are sent out Raman excitation lights which correspond to different wavelength bands, the transmitter-side optical amplification system including a connector connected to the optical transmission path; a pair of optical amplifiers to amplify wavelength multiplexed signals each having a different wavelength band; a blocking filter placed on the output side of one optical amplifier, of the pair of optical amplifiers, which amplifies wavelength multiplexed signals having a shorter wavelength band, of the different wavelength bands; and a coupler which synthesizes the output of the blocking filter and the output of the optical amplifier which amplifies the wavelength multiplexed signals having a longer wavelength band, of the different wavelength bands, for outputs to the optical transmission path through the connector, wherein the coupler further has a function to separate signals for each different wavelength band, the blocking filter having a band which blocks Raman excitation lights corresponding to the different wavelength bands.

In order to attain the above object, according to a fifth aspect of the present invention there is provided an optical relay connected to an optical transmission path through which Raman excitation lights are sent out, the optical relay comprising a connector connected to the optical transmission path; a pair of optical amplifiers for amplifying wavelength multiplexed signals having different wavelength bands; a coupler which synthesizes the outputs of the pair of optical amplifiers, for output to the optical transmission path through the connector; and a blocking filter placed between the coupler and the connector, for blocking wavelength bands of the excitation lights for the wavelength multiplexed signals having different wavelength bands.

In order to attain the above object, according to a sixth aspect of the present invention there is provided an optical relay connected to an optical transmission path through which Raman excitation lights are sent out, the optical relay comprising a connector connected to the optical transmission path; a pair of optical amplifiers for amplifying wavelength multiplexed signals having different wavelength bands; a blocking filter placed on the output side of one optical amplifier, of the pair of optical amplifiers, which amplifies wavelength multiplexed signals having a shorter wavelength band, of the different wavelength bands; and a coupler which synthesizes the output of the blocking filter and the output of the optical amplifier which amplifies the wavelength multiplexed signals having a longer wavelength band, of the different wavelength bands, for outputs to the optical transmission path through the connector, wherein the coupler further has a function to separate signals for each different wavelength band, the blocking filter having a band which blocks Raman excitation lights corresponding to the different wavelength bands.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Preferred embodiments of the present invention will now be described with reference to the drawings.

Figure 1A:
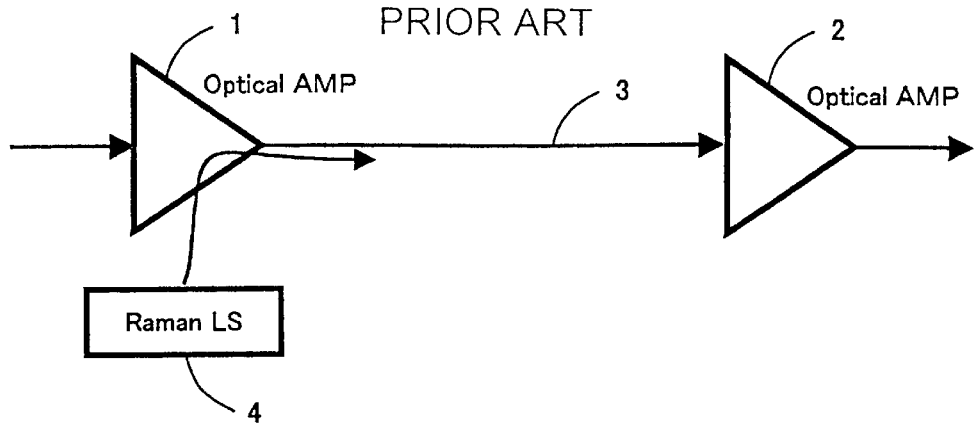
FIGS. 1A to 1C show examples of a system using a Raman amplification.
Figure 1B:
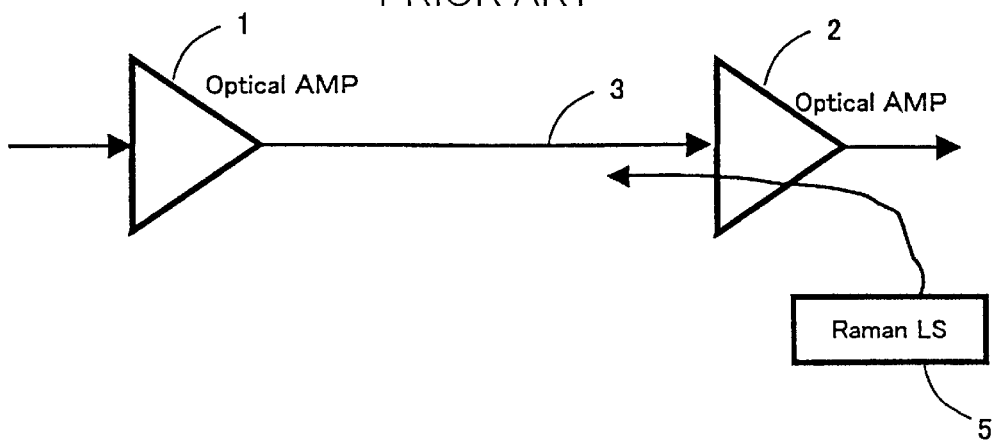
Figure 1C:
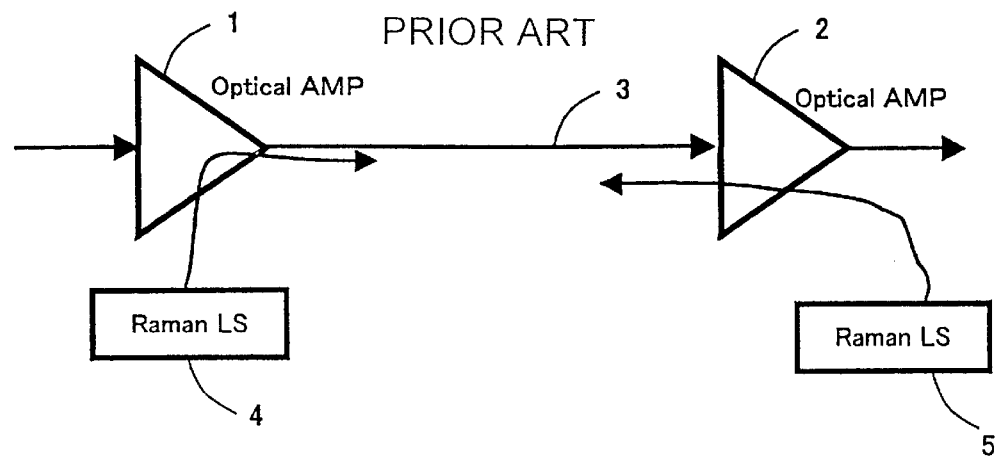
Figure 2:
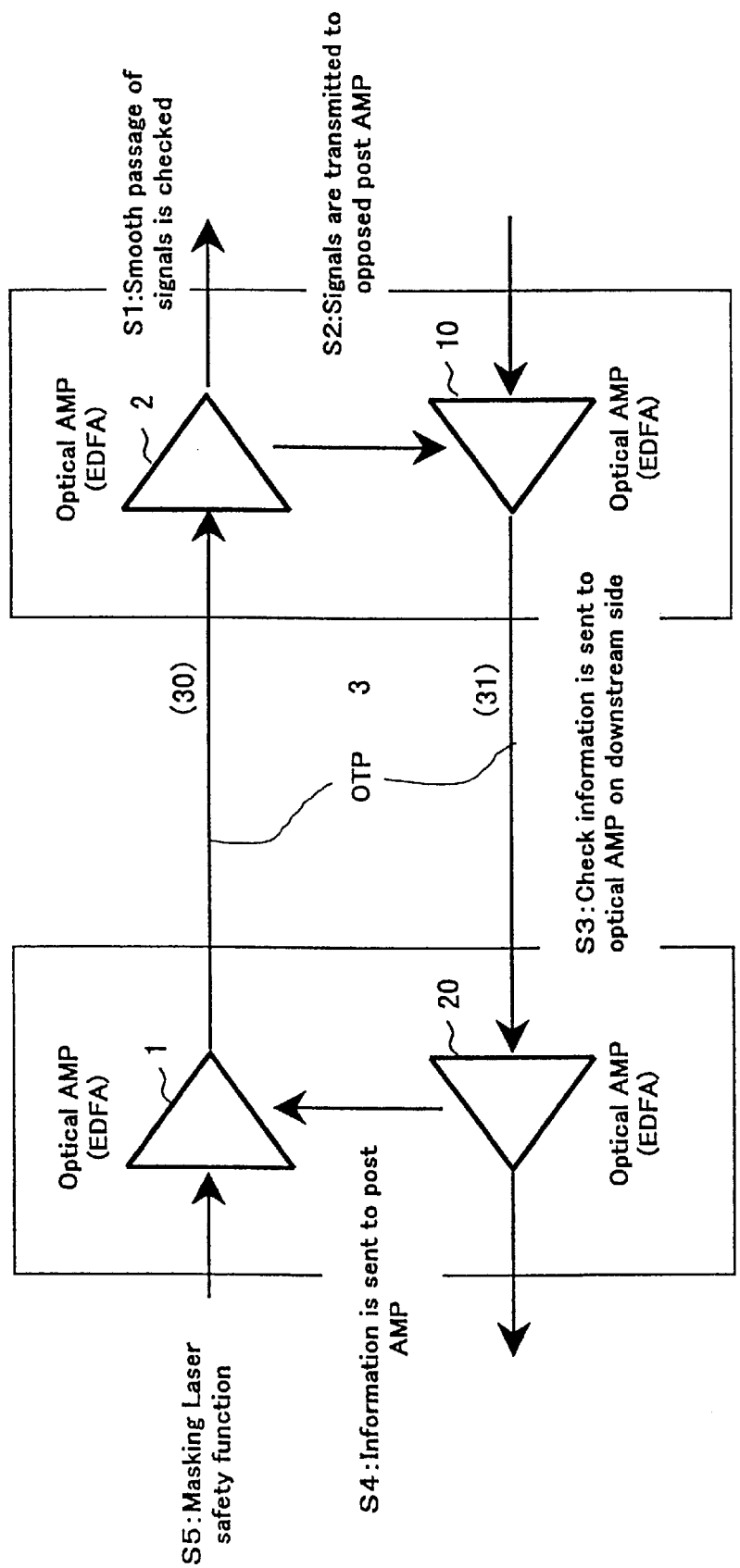
FIG. 2 explains the masking treatment of the Laser Safety Function.
Figure 3:
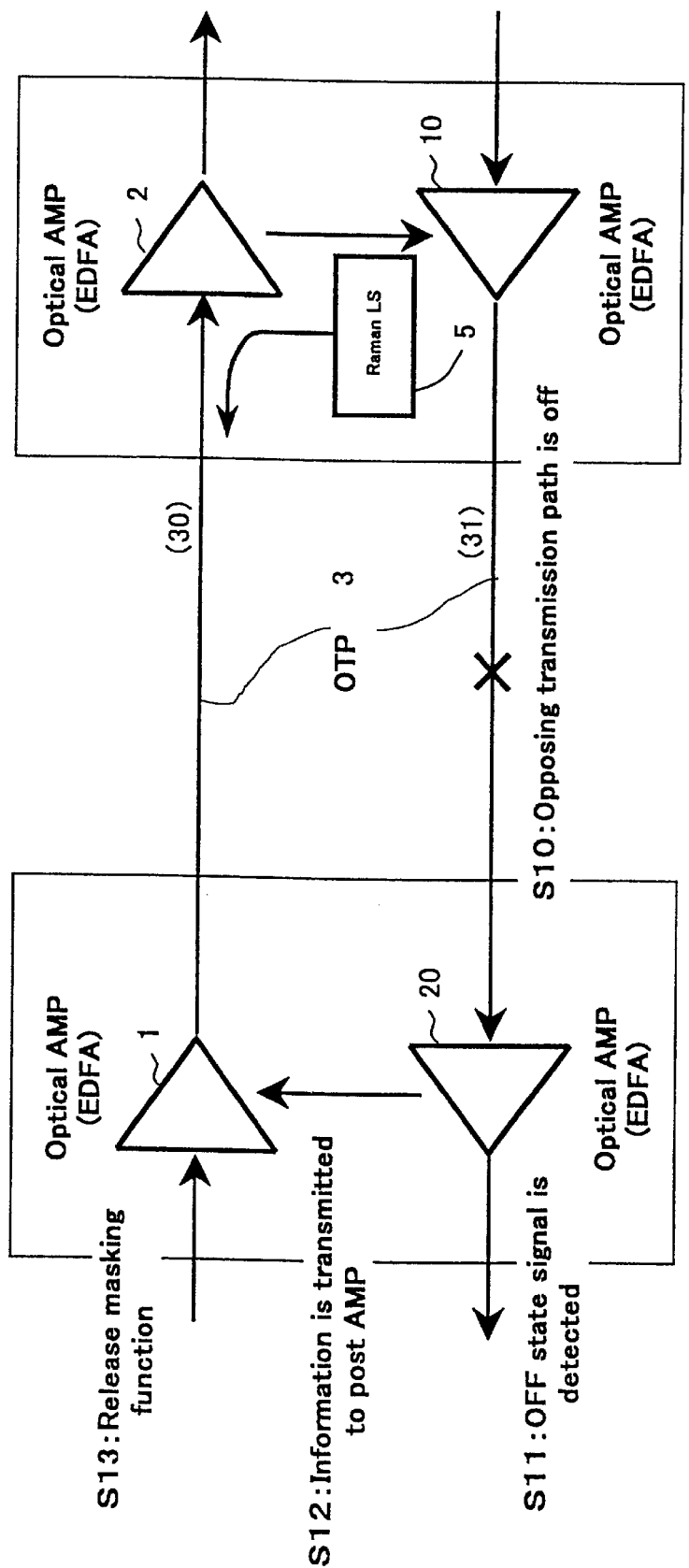
FIG. 3 shows studies on a procedure in the event of the opposed transmission path 31 in the system shown in FIG. 2 is in trouble.
Figure 4:
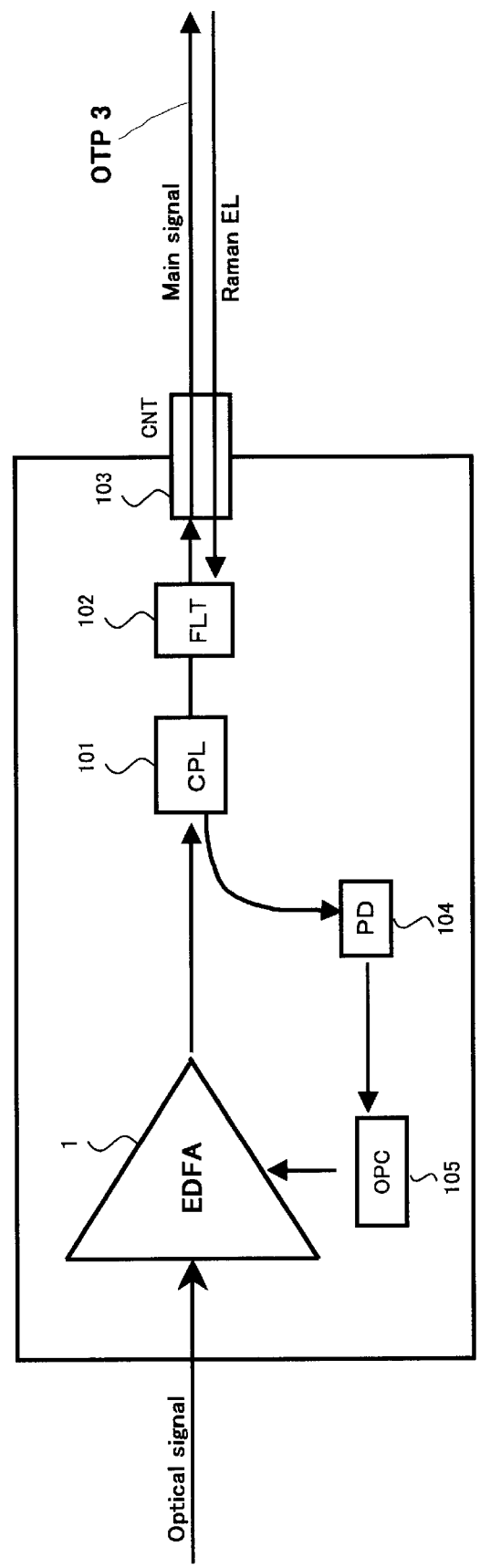
FIG. 4 is a block diagram for embodying an optical amplification system according to the present invention.

FIG. 4 is a block diagram for an embodiment of an optical amplification system under the present invention. Also to simplify the explanation about the features of the present invention, FIG. 4 briefly illustrates only the post amplifier with the optical amplification system used for the end station, or only the amplifier on the output side with the optical amplification system used for the optical relay.

In FIG. 4, an optical amplifier 1 consists of an optical fiber doped with rare earth elements including Er, etc. By the optical amplifier 1, inputted optical signals will be amplified, and sent out to an optical transmission path (TP)3 to be connected to a coupler 103 through a coupler 101 and a blocking filter 102 to be inserted as a features of the present invention.

Here, the blocking filter 102 to be inserted as a feature of the present invention has a band characteristic to allow the main signal light to pass through and will block the Raman excitation light (EL)sent from an opposing optical amplification system. Optical signals branched off at the coupler 101 will be detected by a light receiver element (such as a photo diode) 104, and the output level of the optical amplifier 1 will be controlled by an operation circuit (OPC) 105.

As the Raman excitation light is blocked by the blocking filter 102, usually there is no optical signal to be branched off at the coupler 101 and inputted to the light receiver element 104. On the other hand, when a connector 103 comes out of place, the reflected light to be Fresnel reflected from the open end face of the connector will be branched off at the coupler 101 and inputted to the light receiver element 104.

Therefore, the light receiver element 104 is able to detect the removed state of the connector 103, from the reflection light of the connector 103. And, when the removed state of the connector 103 was detected by the light receiver element 104, the Laser Safety function turns ON, and the output of the optical amplifier 1 can be reduced to a safety light level by the operation circuit 105.

Figure 5:
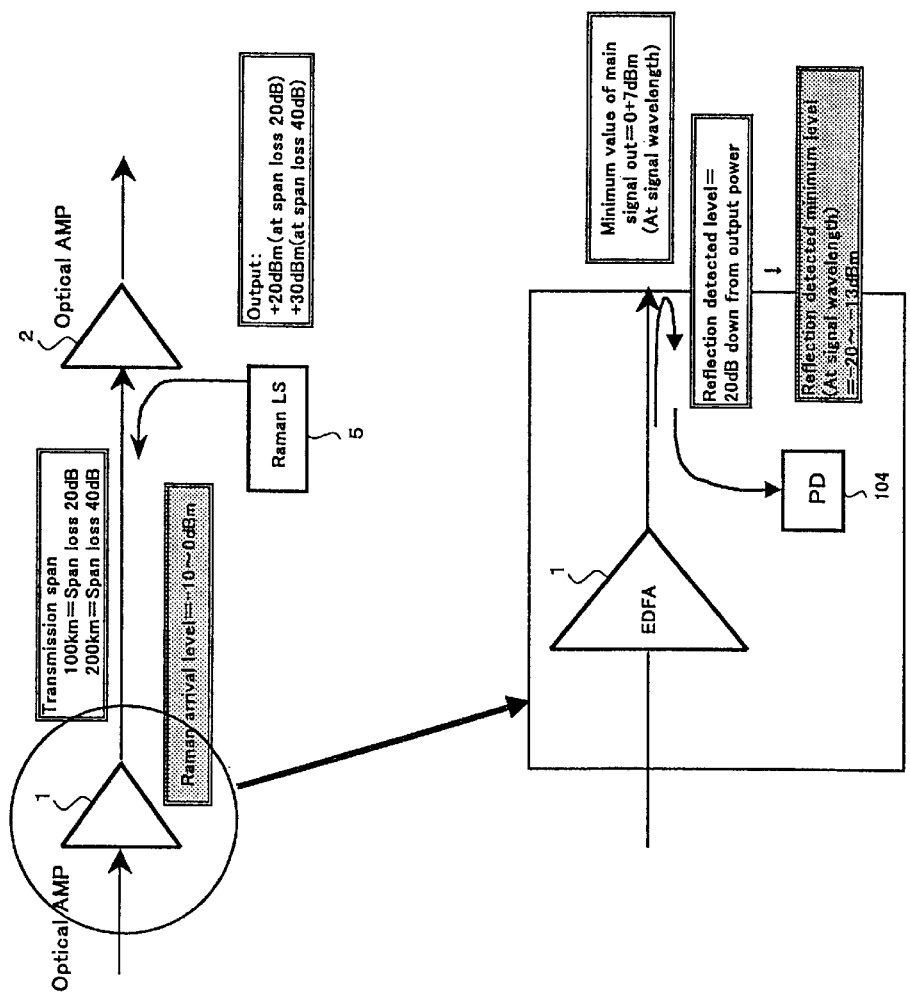
FIG. 5 shows studies on the amount of attenuation required for a Raman excitation light blocking filter 102 to be inserted as a feature of the present invention.

Here, based on FIG. 5, studies are made on the attenuation amount required for the Raman excitation light blocking filter 102 to be inserted as a feature of the present invention. In FIG. 5, a transmission path loss is assumed to be 20 dB/100 Km, and the distance of transmission path between an optical amplifier 1 on the upstream side and an optical amplifier 2 on the downstream side to be 100 Km through 200 Km.

When the output power of a Raman excitation light source 5 to be placed on the optical amplifier 2 on the downstream side is +20dBm, at span loss 20 dB (distance of transmission path being 100 Km), or +30 dBm, at span loss 40 dB (distance of transmission path being 200 Km), the arrival level of the Raman excitation light to the optical amplifier 1 is −10 through 0 dBm.

On the other hand, the minimum output value of the main signal light coming from the optical amplifier 1 is 0 through +7 dBm, only when there is one wave. While the optical signal to be reflected because of the connector being removed will be attenuated 20 dB from the output power, and the minimum value for detecting reflection at the light receiver element 104 is −20 through −13 dBm.

Therefore, the difference between the maximum value for the Raman excitation light arrival level and the minimum value for detecting reflection is 0 dBm-(−20 dBm)=20 dBm, and this result means the attenuation amount required for the blocking filter 102.

The Raman light blocking filter 102 can be obtained by several methods. The following describes some of them.

Figure 6:
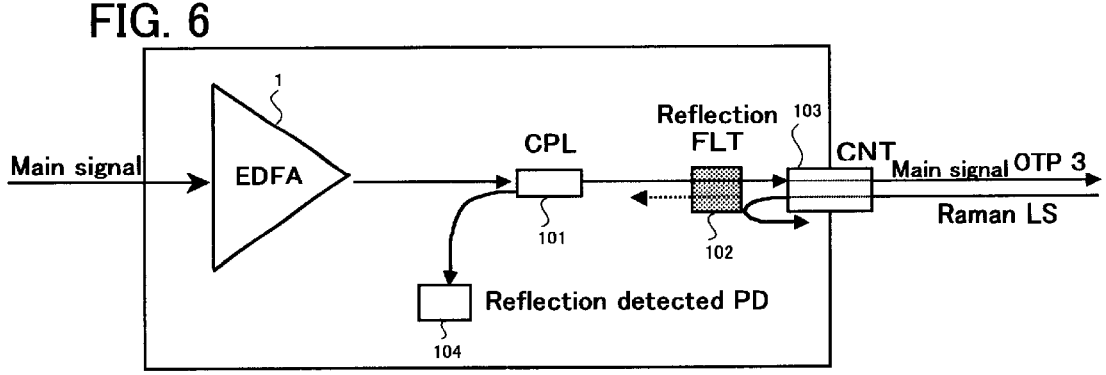
FIG. 6 is a block diagram an embodiment for configuring a blocking filter 104, a feature of the present invention, from a reflection filter.

FIG. 6 shows a block diagram of the embodiment to construct a blocking filter 104 featuring the present invention with a reflection filter.

In this embodiment, for the main signal having wavelength of 1550 nm band, configuration is made so that on a circuit board glass, an optical reflection film that selectively reflects excitation lights of 1450 nm band is formed, and this optical reflection film is added between the coupler 101 and the connector 103.

The optical refletion film can be obtained, for instance, from a multiplex interference film formed through the alternate vapor deposition of TiO and SiO.

The blocking filter 102 consisting of the optical reflection film reflects the excitation light of 1450 nm band to be inputted from the output side of the optical amplifier 1, and optical signals of the other wavelength bands will pass through the filter. Therefore, when the connector 103 is coming out of place, the optical signals of 1550 nm band to be Fresnel reflected from the open end of the connector will pass through the blocking filter 102, and detected by a light receiver element for detecting reflected light. By the detection output, the output power of the optical amplifier 1 will be controlled.

Figure 7:
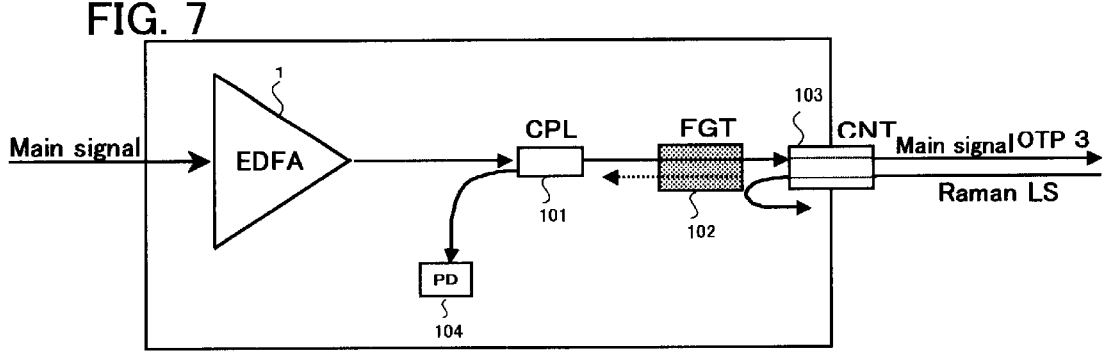
FIG. 7 shows an embodiment for constructing a blocking filter 104 to be inserted as a feature of the present invention, from a fiber grating.

FIG. 7 shows an embodiment to construct a blocking filter 104 to be inserted as a feature of the present invention using a fiber grating. The fiber grating can be obtained by a method to form a diffraction grating on the side face of a fiber, or a method to form an interference fringe on the core of a fiber with a light of high luminous intensity and form a grating to the core by optical damage.

Like the embodiment illustrated in FIG. 7, in the case of the blocking filter constructed of the fiber grating, the excitation light of 1450 nm band to be inputted from the output side of the optical amplifier 1 will be reflected, and the optical signals of the other wavelength bands will pass through the filter.

Figure 8:
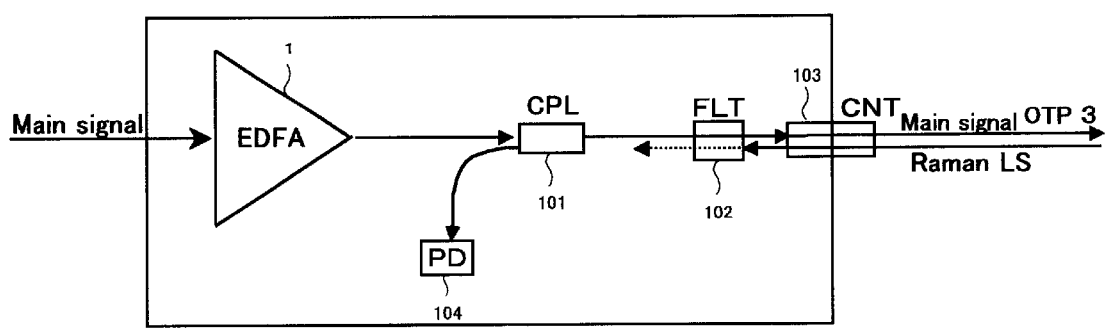
FIG. 8 shows an embodiment for constructing a blocking filter 104, a feature of the present invention, from an attenuation film filter.

FIG. 8 shows an embodiment to construct the blocking filter 104, a feature of the present invention, of an attenuation film filter. It is possible to construct an attenuation filter for the Raman excitation light, in terms of equivalency, with the use of an attenuation film having a large attenuation amount, as the Raman excitation light level at the end face of the connector 103 and the level of the main optical signal are large, provided that the level of the Raman excitation light to be radiated in the light receiver element 104 for detecting reflection to be lowered.

Here, when the blocking filter 104 is constructed of the reflection film as illustrated in FIG. 6, or the attenuation film as illustrated in FIG. 8, it is possible to form the blocking filter 104 together with the connector 103 into one piece, instead of the blocking filter 104 to be put between the coupler 101 and the connector 103. In other words, it is possible to form the blocking filter by attaching the reflection film and attenuation film to the end face of the connector.

Figure 9:
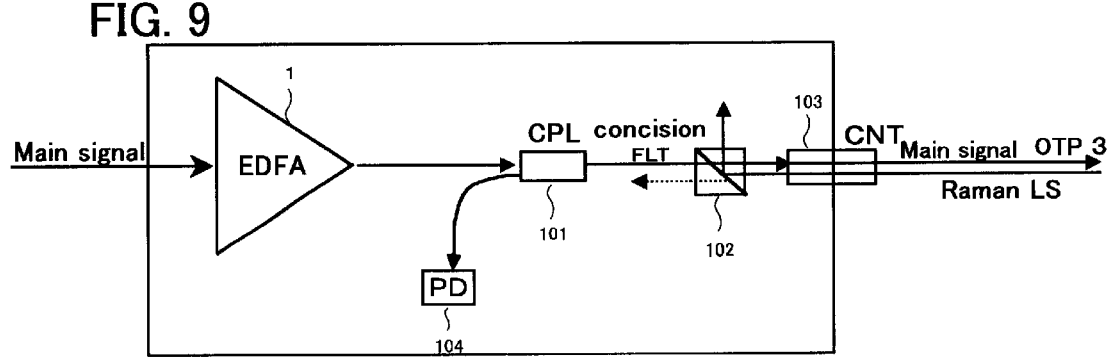
FIG. 9 shows an example of using a separation filter as a blocking filter 104, a feature of the present invention.

FIG. 9 shows an example of using a separation filter as the blocking filter 104, a feature of the present invention. In this example, the dielectric multilayer film is formed in a plurality of layers and located at an angle of 45 degrees. By this, a configuration is made so that the Raman excitation light to be inputted from the output side of the optical amplifier 1 can be allowed to vertically reflect at the face of the dielectric multilayer film, and the reflection light at the time of the connector coming out of place can be allowed to go straight to the light receiver element 104, passing through the face of the dielectric multilayer film.

Figure 10:
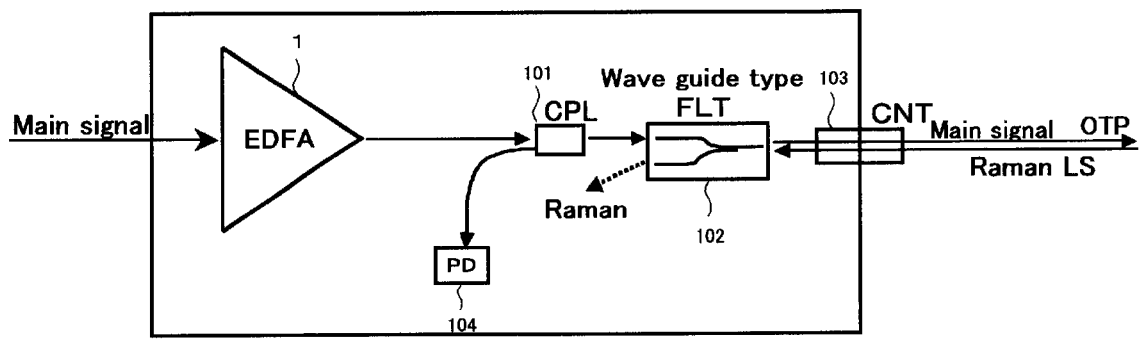
FIG. 10 shows an example of using a waveguide type filter as a blocking filter 102.

FIG. 10 shows an example of using a waveguide type filter as a blocking filter 102. This example shows how to create a waveguide using a photolithography, by accumulating quartz-based glass on a metal Si circuit board by the vapor phase developing method. The direction of the waveguide is set so that the Raman excitation light to be inputted from the output side of the optical amplifier 1 is not inputted to the light receiver element 104.

Here, each of the embodiments mainly describes about an example of using the backward excitation method. However, the application of the present invention is not limited to these embodiments, and also in the two-way excitation method, the same configuration as shown in each of the embodiments can bring similar effect, as the Raman excitation light exists in the reverse direction of the main signal.

Figure 11:
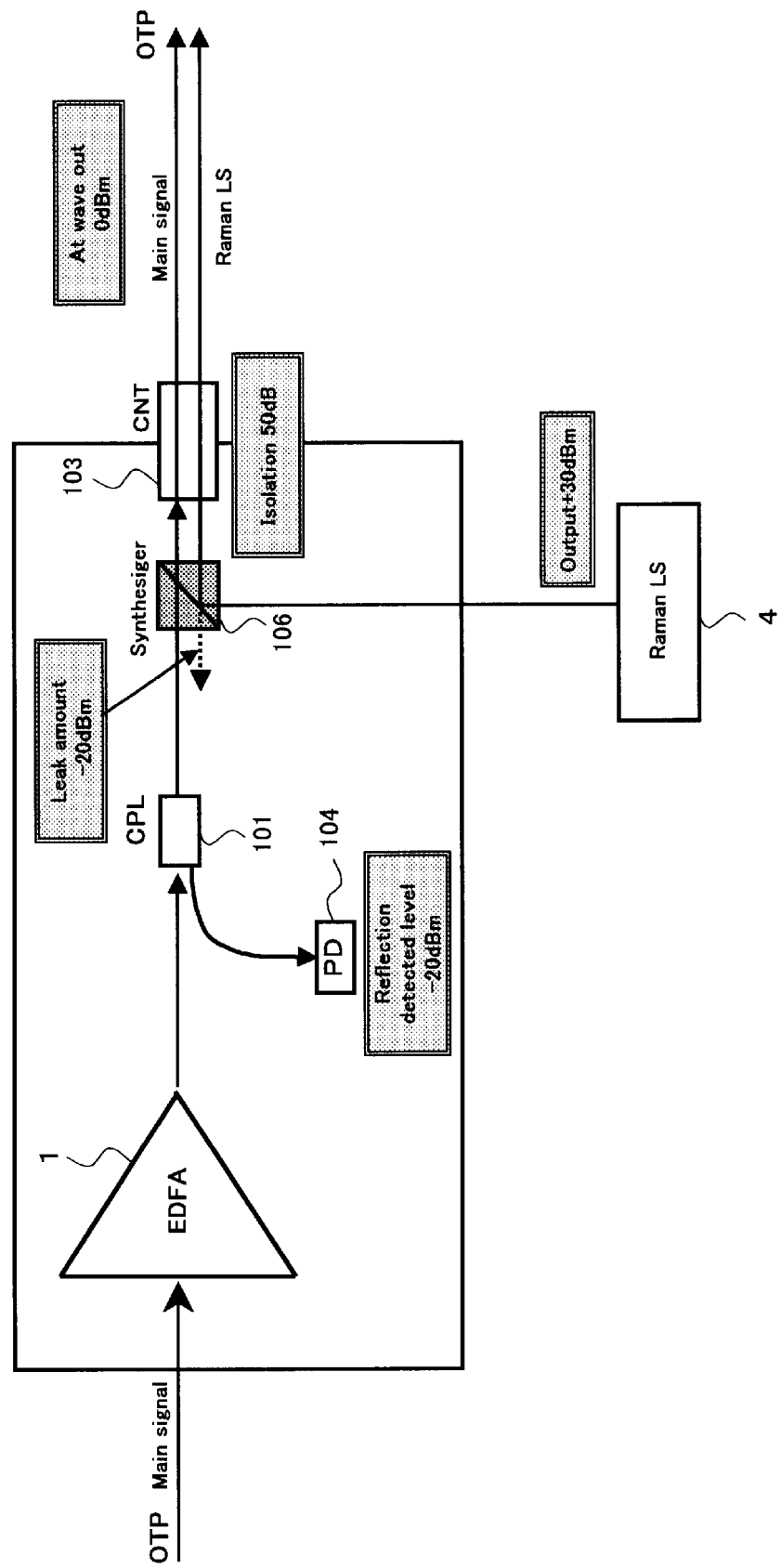
FIG. 11 shows studies on the detection level at an optical receiver element 104 in the forward excitation method.

Moreover, the present invention can be similarly applied to the forward excitation method where the Raman excitation light is propagated in the same direction as the main signal. FIG. 11 shows examinations on the detection level at the light receiver element 104 in the forward excitation method.

In FIG. 11, a wave synthesizer 106 reflects the Raman reflection light from a Raman excitation light source 4 and outputs to an optical transmission path 3. While the optical main signal coming from the optical amplifier 1 is sent out to the optical transmission path 3 through a wave synthesizer 106.

Here, the isolation of a wave synthesizer 105 is assumed to be 50 dBm, and the output level of the Raman excitation light from the Raman excitation light source 4 is assumed to be +30 dBm. Therefore, when the Raman excitation light, the output of the Raman excitation light source 4 is inputted to the wave synthesizer 106, the leak amount toward the side of the optical amplifier 1 will be −20 dBm.

The leak amount is within the range of the detection level (−20 dBm) of the light receiver element 104. From this reason, at the light receiver element 104, leaking Raman excitation light could be detected.

Figure 12:
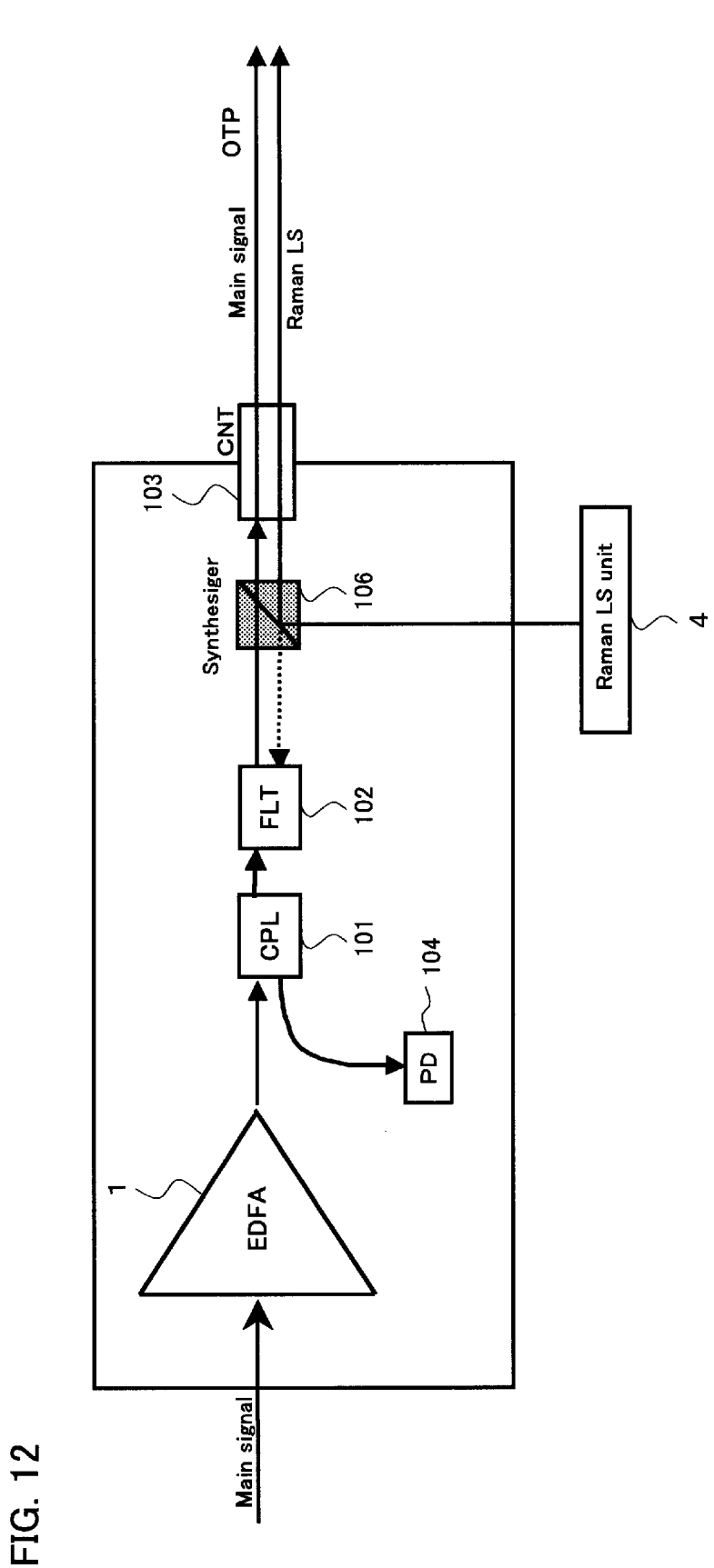
FIG. 12 shows how to insert a blocking filter 102 by applying the present invention, in the forward excitation method illustrated in FIG. 11.

Therefore, in the forward excitation method as illustrated in FIG. 11, a blocking filter 102 is inserted as illustrated in FIG. 12 with the application of the present invention. The blocking filter 102 can be formed in the same manner of the previously described embodiment as illustrated either in FIG. 6 or FIG. 10.

In FIG. 12, the leaking amount (−20 dBm) of the raman excitation light can be blocked by the blocking filter 102. Therefore, detecting the leaking excitation light level by the light receiver element 104 can be avoided. And such a case can also be avoided from happening, that misrecognizing the detected leaking excitation light as a sign of the disconnected connector 103 leads up to the control of the output level of the optical amplifier 1 to bring it down.

Here, description is made mainly of an example of locating the insertion position of the Raman excitation light blocking filter, to be inserted under the present invention, at the connector 103-to-the coupler 101, in the embodiment as described above. The application of the present invention is not limited to such a case. The following shows other examples of applying the present invention.

Figure 13:
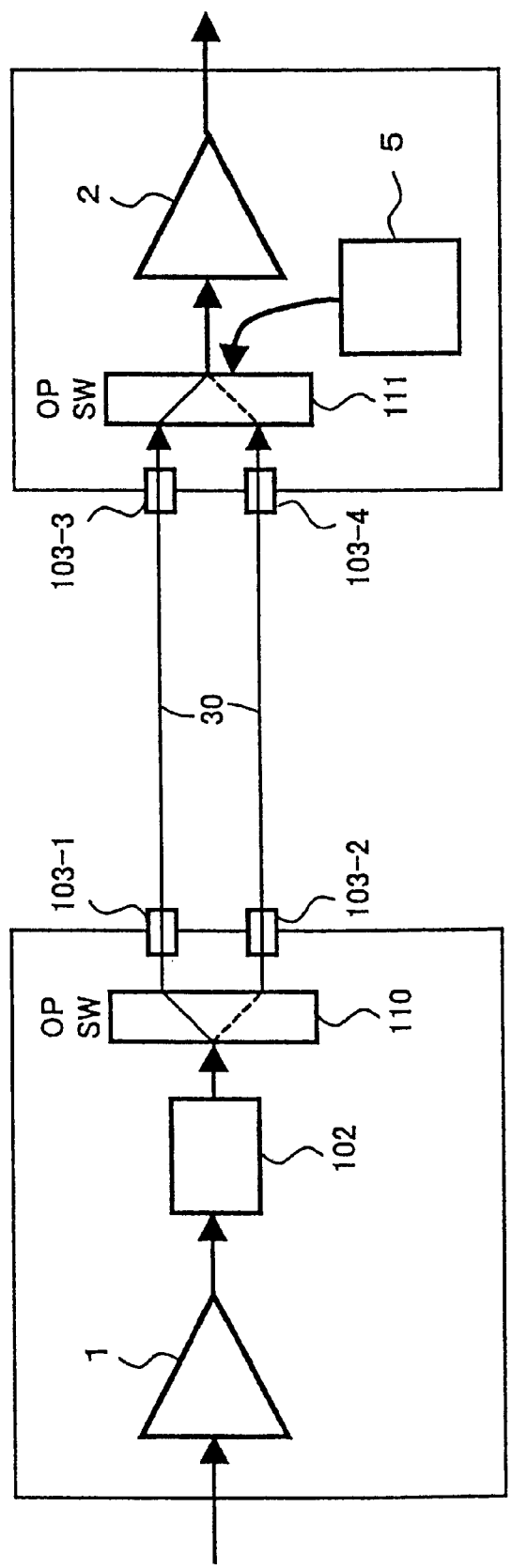
FIG. 13 shows an example of a system applying the present invention to its redundancy system.

FIG. 13 shows an example of a system which applies the present invention to its redundancy system. Also in the following drawings, the coupler 101, the light receiver element 104 and the operation circuit 105 are briefly noted.

In FIG. 13, as a feature of the system, an optical amplification system A and B are connected with a redundancy transmission path 30 for current use or for spare. The drawing shows, as the redundancy transmission path 30, only the configuration in the direction from the optical amplification system A to the optical amplification system B, but omits the configuration in the direction from the optical amplification system B to the optical amplification system A to be connected with the redundancy transmission path for simplifying purpose.

Each of the optical amplification system A and the optical amplification system B has optical change-over switches 110 and 111.

In the normal operation with the optical change-over switches 110 and 111, to the currently used transmission path which connects a connector 103-1 for the optical amplification system A and a connector 103-3 for the optical amplification system B, signals are connected and set so that signals can smoothly pass through the path.

And, in maintaining the normal operating system, by the optical change-over switches 110 and 111, signals are connected and set to a spare transmission path, which connects a connector 103-2 for the optical amplification system A and a connector 103-4 for the optical amplification system B, so that signals can smoothly pass through the path.

On such a system as illustrated in FIG. 13, the Raman excitation light blocking filter 102 to be inserted under the present invention is placed on the front step of the optical change-over switch 110 for the optical amplification system A. By this positioning, the blocking filter 102 can be a common part for the current use and spare redundancy transmission paths.

Here, in the description of the embodiment as described above, wavelength multiplexed optical signals having a single band is a precondition, however, the present invention can also be applied to an optical amplification system which handles wavelength multiplexed optical signals having a plurality of bands.

Figure 14:
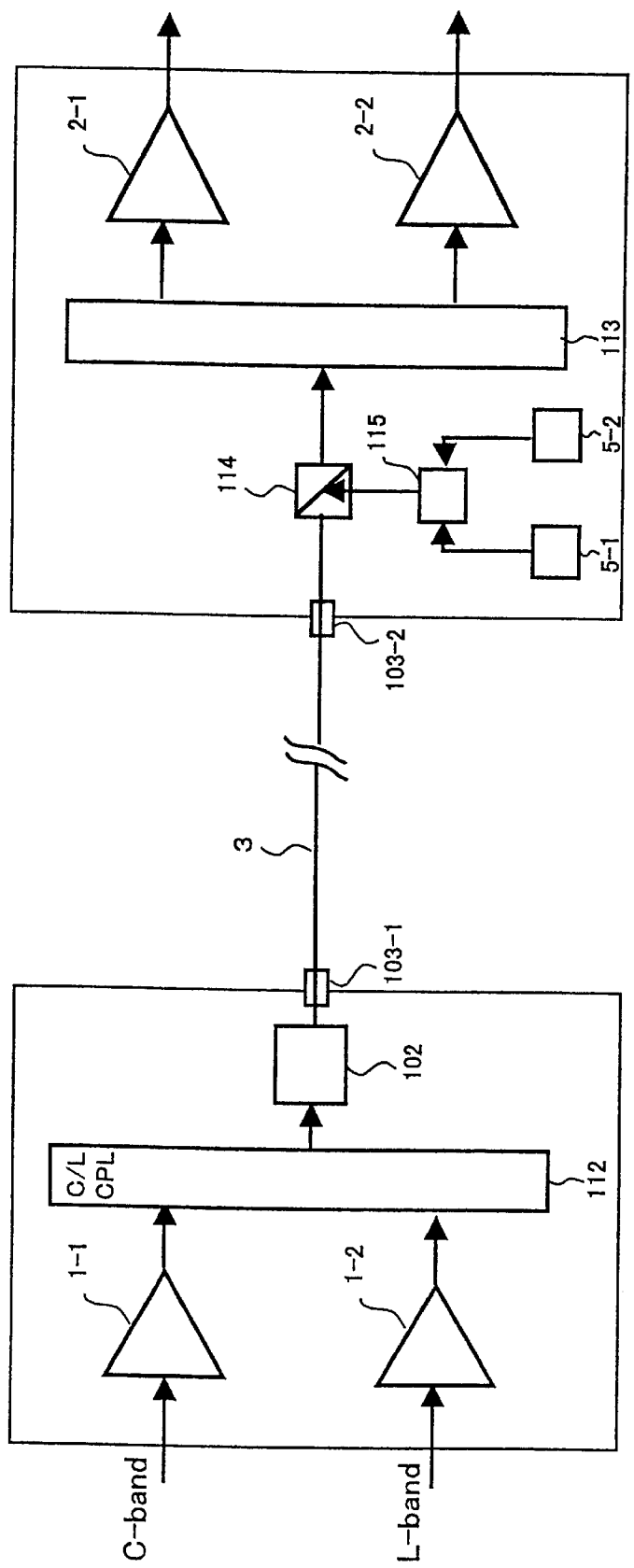
FIG. 14 shows an example of applying the present invention to a system for transmitting wavelength multiplexed signals of the C-band and L-band.

FIG. 14 shows an example of applying the present invention to a system that transmits wavelength multiplexed signals having a C-band or L-band. On the optical amplification system A, the wavelength multiplexed signals having the C-band will be amplified by an optical amplifier 1-1, and the wavelength multiplexed signals having the L-band will be amplified by an optical amplifier 1-2, then, these amplified signals will be inputted to a coupler 112 and synthesized here.

At the rear step of the coupler 112, the blocking filter 102, in other words, a band pass filter or a low pass filter having the pass bands of the C-band and L-band, will be located, as a feature of the present invention.

Figure 15:
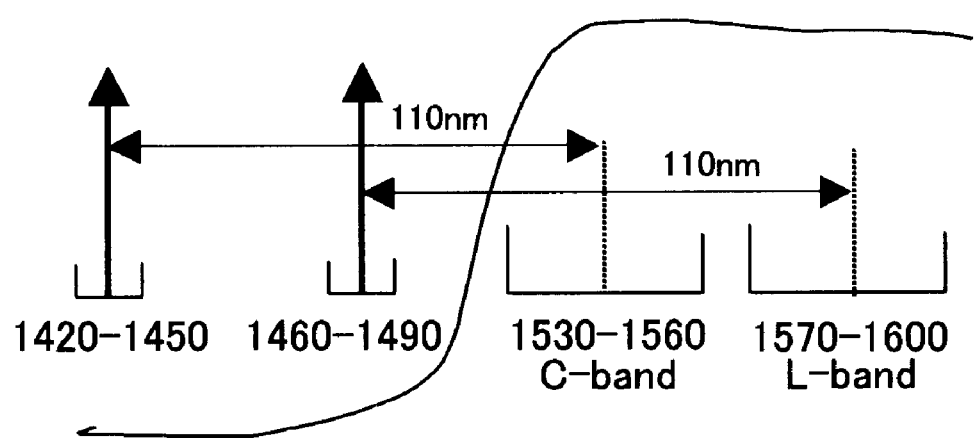
FIG. 15 shows the C-band, L-band and wavelength spectrum of Raman excitation lights for these bands.

FIG. 15 shows the C-band, L-band and the wavelength spectrum of the Raman excitation light against these bands. The C-band has a wavelength band of 1530 through 1560 nm, and the L-band has a wavelength band of 1570 through 1600 nm. For the medium wavelength in the zone of the C-band, the Raman excitation light of 1420 through 1450 nm having short wavelength of 110 nm will be used. Further, for the medium wavelength in the zone of the L-band, the Raman excitation light of 1460 through 1490 nm having short wavelength of 110 nm will be used.

Therefore, the blocking filter 102 illustrated in FIG. 14 has a band filter characteristic with its pass band to be 1530 through 1600 nm band, or a low pass filter characteristic having large amount of attenuation for signals of 1490 nm wavelength or less.

Thus, on the optical amplification system B, the Raman excitation light from Raman excitation light sources 5-1 and 5-2, each having the wavelength of around 1450 nm or 1485 nm will be synthesized at a coupler 114 and sent out to the optical amplification system A.

Therefore, as a principle, the Raman excitation light should be inputted through a connector 103-1 for the optical amplification system A, but as a matter of fact, the Raman excitation light will be blocked by the blocking filter 102 and will not be inputted to a light receiver element, which is not noted in FIG. 14. While the optical main signals in the zone of the C-band and the optical main signals in the zone of the L-band will be synthesized by a coupler 112 and sent out to a transmission path 3 through the blocking filter 102. On the optical amplification system B on the receiver side, the received wavelength multiplexed signals will be separated into the main optical signals of the C-band, or the L-band, respectively, with a wave separator 113 and inputted to the optical amplifier 2-1 or 2-2, so that these optical signals can be amplified to a detectable level.

Here, on the optical amplification system A, if the coupler 112 is not connected, at the end face of a connector 103-1, a Fresnel reflection takes place, and the Fresnel reflection will be inputted to a light receiver element through the blocking filter 102. From this input, the disconnected connector can be detected and the output power of optical amplifiers 1-1 and 1-2 will be reduced, accordingly.

Figure 16:
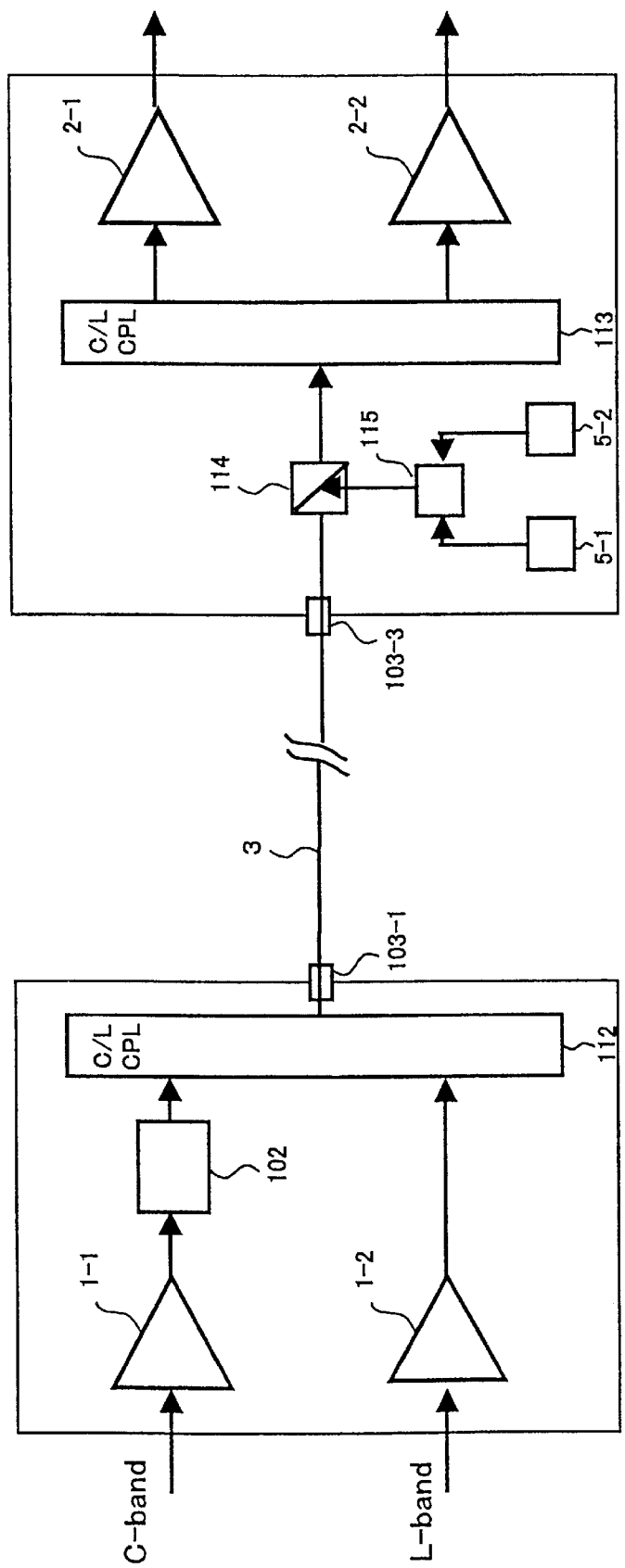
FIG. 16 shows an example of a configuration, where the insertion position of a blocking filter 102 is changed from the configuration shown in FIG. 14.

FIG. 16 shows an example of the configuration, where the insertion position of the blocking filter 102 is different from the position in the configuration illustrated in FIG. 14, and the blocking filter 102 is inserted between a coupler 112 and the optical amplifier 1-1 for the C-band zone. In this embodiment, the coupler 112, that synthesizes the optical main signals of the C-band zone and the L-band zone, has a wave separation characteristic in the reverse direction.

Figure 17:
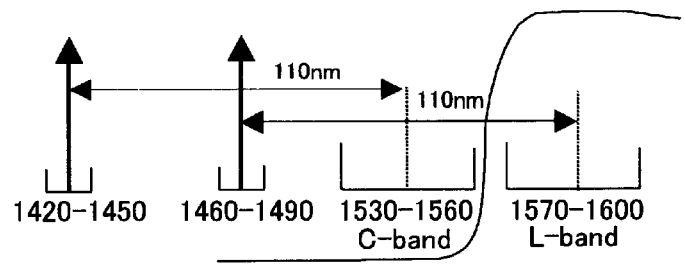
FIG. 17 explains a low pass function and a high pass function of the coupler 112 shown in FIG. 16.

In other words, the coupler 112 has a low pass function and a high pass function, and as illustrated in FIG. 17, by the low pass function, the coupler will pass the signals having wavelengths of the L-band zone inputted from the transmission path 3 and will output to the side of the optical amplifier 1-2, and by the high pass function, it will pass the signals having wavelengths of more than the C-band and will output to the side of the optical amplifier 1-1.

Therefore, the Raman excitation light will not be outputted to the side of the optical amplifier 1-2. On the contrary, to the side of the optical amplifier 1-1, the Raman excitation lights for the C-band and L-band will be inputted. From this, a band characteristic required for the blocking filter 102 should be set to have the low pass function to block the signals having wavelengths of less than 1490 nm from passing.

Here, in the embodiments shown in FIG. 14 and FIG. 16, the end stations are supposed to be the optical amplification systems A and B, but the application of the present invention is not limited to this case. When the optical amplification systems A and B are to be the end stations, the present invention can also be applied to an optical relay to be located on the transmission path 3 that connects the optical amplification systems A and B.

Figure 18:
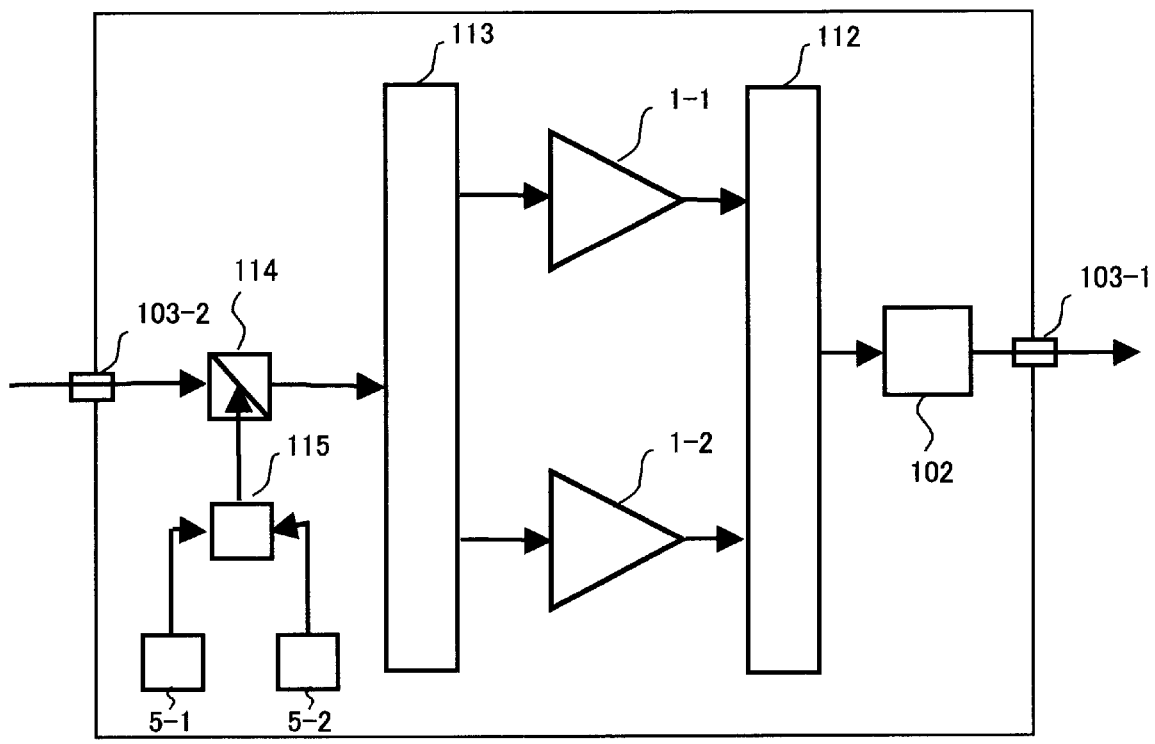
FIG. 18 shows an embodiment to apply the layout of the blocking filter 112 to an optical relay, so as to comply with FIG. 14.
Figure 19:
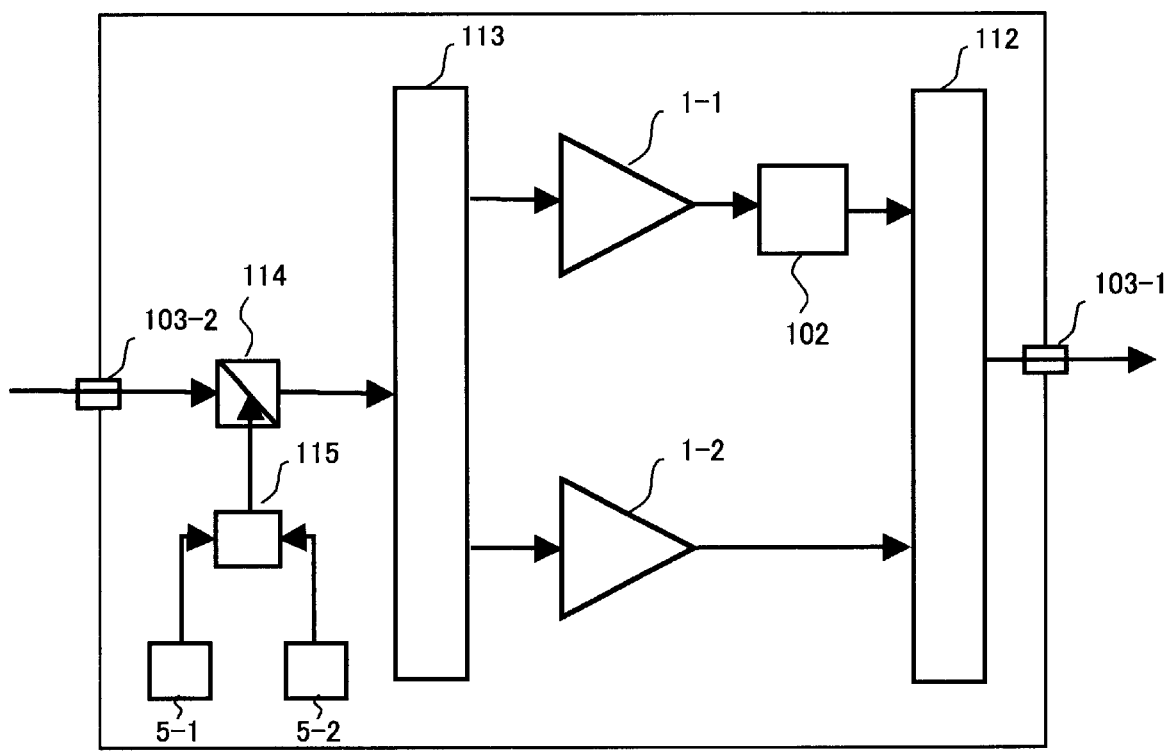
FIG. 19 shows an embodiment to apply the layout of the blocking filter 112 to an optical relay, so as to comply with FIG. 16.

FIGS. 18 and 19, each corresponding to FIGS. 14 and 16, show the embodiments to apply the layout of a blocking filter 112 to an optical relay.

In FIG. 18, the blocking filter 112 is located at the rear step of a coupler 112 that synthesizes optical signals having wavelengths of the C-band and L-band coming from optical amplifiers 1-1 and 1-2 that function as inline amplifiers. On the other hand, in FIG. 19, between the optical amplifier 1-1 and the coupler 112, three blocking filters 112 are located. The band characteristic of the blocking filter 112 in each of the embodiments is the same as the embodiment shown in FIGS. 14 and 16.

In the embodiment shown in FIG. 14, FIG. 16, FIGS. 18 and 19, explanations were already made on the optical main signals having two channels of the wavelengths of the C-band and the L-band, however, the application of the present invention is not limited to this. In other words, the present invention can similarly be applied to the O-band (around 1300 nm), E-band (around 1400 nm), S-band (around 1500 nm), L-band (around 1600 nm), U-band (around 1650 nm), etc.

As set forth hereinabove on the embodiments with reference to the drawings, the present invention makes it possible to prevent Raman excitation lights from entering, and to keep the Laser Safety function (output drop) caused by the detection of reflection light at the time of disconnected connector.

Moreover, the application of the present invention can facilitate the addition of a Raman excitation light source in the event of the future increase in the number of wavelengths, even if, on the assumption that an optical transmission system would be sequentially extended, the system was configured without a Raman excitation at the time of initial introduction.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An optical amplification system connected via a connector to an optical transmission path through which Raman excitation lights are sent out, the optical amplification system comprising:

an optical amplifier to amplify optical main signals;

an optical receiver element to detect reflection lights from an end face of the connector, when the connector is disconnected;

a circuit to reduction control the output power of the optical amplifier, based on the detection of the reflection light by the optical receiver element; and a blocking filter inserted between the optical amplifier and the connector, for blocking the Raman excitation lights.

2. An optical amplification system connected via a connector to an optical transmission path through which Raman excitation lights are sent out, the optical amplification system comprising:

an optical amplifier to amplify optical main signals;

a Raman excitation light source to output Raman excitation lights;

a wave synthesizer to synthesize optical main signals amplified by the optical amplifier, and the Raman excitation lights, for sending out to the transmission path;

an optical receiver element to detect reflection lights from an end face of the connector, when the connector is disconnected;

a circuit to reduction control the output power of the optical amplifier, based on the detection of reflection light by the optical receiver element; and a blocking filter inserted between the optical amplifier and the connector, for blocking the Raman excitation light.

3. The optical amplification system according to claim 1, wherein the blocking filter is comprised of a reflection film that reflects the wavelength band of the Raman excitation light.

4. The optical amplification system according to claim 2, wherein the blocking filter is comprised of a reflection film that reflects the wavelength band of the Raman excitation light.

5. The optical amplification system according to claim 3, wherein the reflection film is attached to the connector end face so that the blocking filter id integral with the connector.

6. The optical amplification system according to claim 4, wherein the reflection film is attached to the connector end face so that the blocking filter id integral with the connector.

7. The optical amplification system according to claim 1, wherein the blocking filter is comprised of a fiber grating that reflects the wavelength band of the Raman excitation light.

8. The optical amplification system according to claim 2, wherein the blocking filter is comprised of a fiber grating that reflects the wavelength band of the Raman excitation light.

9. The optical amplification system according to claim 1, wherein the blocking filter is comprised of an attenuation film that attenuates the wavelength band of Raman excitation light.

10. The optical amplification system according to claim 2, wherein the blocking filter is comprised of an attenuation film that attenuates the wavelength band of Raman excitation light.

11. The optical amplification system according to claim 1, wherein the blocking filter is comprised of a wavelength separation filter that separates the wavelength band of the Raman excitation light and the wavelength of the optical main signal.

12. The optical amplification system according to claim 2, wherein the blocking filter is comprised of a wavelength separation filter that separates the wavelength band of the Raman excitation light and the wavelength of the optical main signal.

13. The optical amplification system according to claim 1, wherein the blocking filter is comprised of a waveguide type filter that separates the wavelength band of the Raman excitation light and the directional path of the optical main signal wavelength.

14. The optical amplification system according to claim 2, wherein the blocking filter is comprised of a waveguide type filter that separates the wavelength band of the Raman excitation light and the directional path of the optical main signal wavelength.

15. An optical transmission system comprising:

a transmitter-side optical amplification system; and a receiver-side optical amplification system which are connected through a pair of optical transmission paths for current use and for spare, from which a Raman excitation light is sent out, wherein the transmitter-side optical amplification system includes, an optical amplifier to amplify optical main signals to be transmitted, a pair of connectors connected to the pair of optical transmission paths, respectively, an optical switch that changes over to the side of the connector allowing connection to the optical transmission path for current use, out of the pair of connectors, to thereby output optical main signals amplified by the optical amplifier, and a blocking filter placed between the optical amplifier and the optical switch, for blocking the Raman excitation light.

16. An optical transmission system comprising:

a transmitter-side optical amplification system; and a receiver-side optical amplification system which are connected through an optical transmission path through which a Raman excitation light is sent out, wherein the transmitter-side optical amplification system includes, a connector connected to the optical transmission path, a pair of optical amplifiers to amplify wavelength multiplexed signals each having a different wavelength band, a coupler which synthesizes the outputs of the pair of optical amplifiers, for output to the optical transmission path through the connector, and a blocking filter placed between the coupler and the connector, for blocking wavelength bands of excitation lights for the wavelength multiplexed signals each having a different wavelength band.

17. An optical transmission system comprising:

a transmitter-side optical amplification system; and a receiver-side optical amplification system which are connected through an optical transmission path through which are sent out Raman excitation lights which correspond to different wavelength bands, wherein the transmitter-side optical amplification system includes, a connector connected to the optical transmission path, a pair of optical amplifiers to amplify wavelength multiplexed signals each having a different wavelength band, a blocking filter placed on the output side of one optical amplifier, of the pair of optical amplifiers, which amplifies wavelength multiplexed signals having a shorter wavelength band, of the different wavelength bands, and a coupler which synthesizes the output of the blocking filter and the output of the optical amplifier which amplifies the wavelength multiplexed signals having a longer wavelength band, of the different wavelength bands, for outputs to the optical transmission path through the connector, the coupler further having a function to separate signals for each different wavelength band, and the blocking filter having a band which blocks Raman excitation lights corresponding to the different wavelength bands.

18. An optical relay connected to an optical transmission path through which Raman excitation lights are sent out, the optical relay comprising:

a connector connected to the optical transmission path;

a pair of optical amplifiers for amplifying wavelength multiplexed signals having different wavelength bands;

a coupler which synthesizes the outputs of the pair of optical amplifiers, for output to the optical transmission path through the connector; and a blocking filter placed between the coupler and the connector, for blocking wavelength bands of the excitation lights for the wavelength multiplexed signals having different wavelength bands.

19. An optical relay connected to an optical transmission path through which Raman excitation lights are sent out, the optical relay comprising:

a connector connected to the optical transmission path;

a pair of optical amplifiers for amplifying wavelength multiplexed signals having different wavelength bands;

a blocking filter placed on the output side of one optical amplifier, of the pair of optical amplifiers, which amplifies wavelength multiplexed signals having a shorter wavelength band, of the different wavelength bands; and a coupler which synthesizes the output of the blocking filter and the output of the optical amplifier which amplifies the wavelength multiplexed signals having a longer wavelength band, of the different wavelength bands, for outputs to the optical transmission path through the connector, the coupler further having a function to separate signals for each different wavelength band, the blocking filter having a band which blocks Raman excitation lights corresponding to the different wavelength bands.

* * * * *